US011399106B2

(12) United States Patent
Satake

(10) Patent No.: US 11,399,106 B2
(45) Date of Patent: Jul. 26, 2022

(54) INFORMATION PROCESSING APPARATUS AND NON-TRANSITORY COMPUTER READABLE MEDIUM FOR SCROLLING THROUGH LIST ITEMS

(71) Applicant: FUJIFILM Business Innovation Corp., Tokyo (JP)

(72) Inventor: Masanori Satake, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 179 days.

(21) Appl. No.: 16/538,844

(22) Filed: Aug. 13, 2019

(65) Prior Publication Data
US 2020/0059568 A1   Feb. 20, 2020

(30) Foreign Application Priority Data

Aug. 20, 2018 (JP) .............................. JP2018-153964

(51) Int. Cl.
*H04N 1/00* (2006.01)

(52) U.S. Cl.
CPC ..... *H04N 1/00427* (2013.01); *H04N 1/00411* (2013.01); *H04N 1/00469* (2013.01); *H04N 1/00474* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| 7,493,567 | B2 * | 2/2009 | Ollis | G06F 3/0482 |
| | | | | 715/758 |
| 9,189,140 | B2 * | 11/2015 | Yoshida | G06F 3/0485 |
| 2008/0215978 | A1 * | 9/2008 | Bamba | H04N 1/00424 |
| | | | | 715/713 |
| 2009/0327952 | A1 * | 12/2009 | Karas | G06F 9/451 |
| | | | | 715/786 |
| 2010/0039399 | A1 | 2/2010 | Kim | |
| 2013/0222435 | A1 * | 8/2013 | Choi | H04M 1/2746 |
| | | | | 345/684 |

(Continued)

FOREIGN PATENT DOCUMENTS

| JP | 2006276910 | 10/2006 |
| JP | 4979891 | 7/2012 |
| JP | 2017-227965 | 12/2017 |

OTHER PUBLICATIONS

"Office Action of Japan Counterpart Application" with English translation thereof, dated Apr. 19, 2022, p. 1-p. 8.

*Primary Examiner* — Henok Shiferaw
(74) *Attorney, Agent, or Firm* — JCIPRNET

(57) ABSTRACT

An information processing apparatus includes a display unit that has a touch panel function, an operation reception unit that receives a user instruction based on a touch operation performed on the display unit, and a display control unit that, when plural list items are displayed in a display area of the display unit, controls the display unit such that, if the operation reception unit receives an instruction to scroll through the plural list items, the plural list items are scrolled in the display area and, if a user selects a certain list item from the plural list items, the selected certain list item is fixed at an end of the display area in a scrolling direction.

13 Claims, 21 Drawing Sheets

(56) References Cited

U.S. PATENT DOCUMENTS

| | | | |
|---|---|---|---|
| 2014/0331170 A1* | 11/2014 | Hyun | G06F 3/04842 |
| | | | 715/835 |
| 2015/0046864 A1* | 2/2015 | Fujii | G06K 15/1817 |
| | | | 715/771 |
| 2016/0170576 A1* | 6/2016 | Brown | G06F 3/0485 |
| | | | 715/784 |
| 2017/0102849 A1* | 4/2017 | Ha | G06F 3/0482 |
| 2017/0364228 A1 | 12/2017 | Takai | |
| 2018/0129392 A1* | 5/2018 | Ko | G06F 3/0485 |
| 2019/0384471 A1* | 12/2019 | Maekawa | G06F 3/0485 |

\* cited by examiner

FIG. 6
| | | |
|---|---|---|
|  | DUPLEX PRINTING | ONE SIDE |
|  | COLOR MODE | COLOR |
|  | N-UP PRINTING | TWO-UP |
|  | DOCUMENT SIZE | A4 |
|  | STAPLING | NO |
|  | OUTPUT SHEET SIZE | SAME AS DOCUMENT SIZE |
|  | SHEET TRAY SETTING | TRAY 2 |
|  | FRAME REMOVAL | NO |
|  | PUNCHING | YES |
|  | INCLINATION CORRECTION | NO |
|  | PAGE CONSECUTIVE SHOOTING | NO |
|  | STAMP | NO |
|  | PAGE NUMBER | NO |

FIG. 10

| | | |
|---|---|---|
| | INVISIBLE RANGE | |
| | DUPLEX PRINTING | ONE SIDE |
| | COLOR MODE | COLOR |
| | N-UP PRINTING | TWO-UP |
| | DOCUMENT SIZE | A4 |
| | STAPLING | NO |
| | OUTPUT SHEET SIZE | SAME AS DOCUMENT SIZE |
| | SHEET TRAY SETTING | TRAY 2 |
| | FRAME REMOVAL | NO |
| | PUNCHING | YES |
| | INCLINATION CORRECTION | NO |
| | PAGE CONSECUTIVE SHOOTING | NO |
| | STAMP | NO |
| | PAGE NUMBER | NO |
| | INVISIBLE RANGE | |

SCROLLING AREA (VISIBLE RANGE)

INFORMATION PROCESSING APPARATUS AND NON-TRANSITORY COMPUTER READABLE MEDIUM FOR SCROLLING THROUGH LIST ITEMS

CROSS-REFERENCE TO RELATED APPLICATIONS

This application is based on and claims priority under 35 USC 119 from Japanese Patent Application No. 2018-153964 filed Aug. 20, 2018.

BACKGROUND

(i) Technical Field

The present disclosure relates to an information processing apparatus and a non-transitory computer readable medium.

(ii) Related Art

Japanese Patent No. 4979891 discloses a method by which, if a user pins one of a plurality of items displayed on an apparatus, the pinned item is displayed at a top of a list.

Japanese Unexamined Patent Application Publication No. 2017-227965 discloses a display apparatus that, when a plurality of pieces of information on a list are scrolled, stores the use frequency of each of the plurality of pieces of information and stops scrolling with a piece of information that has been used most frequently displayed.

SUMMARY

Aspects of non-limiting embodiments of the present disclosure relate to an information processing apparatus and a non-transitory computer readable medium capable of, when it is difficult to display a plurality of list items in a limited display area at once and the plurality of list items are scrolled, checking a selected list item while scrolling through the other list items.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a display unit that has a touch panel function, an operation reception unit that receives a user instruction based on a touch operation performed on the display unit, and a display control unit that, when a plurality of list items are displayed in a display area of the display unit, controls the display unit such that, if the operation reception unit receives an instruction to scroll through the plurality of list items, the plurality of list items are scrolled in the display area and, if a user selects a certain list item from the plurality of list items, the selected certain list item is fixed at an end of the display area in a scrolling direction.

BRIEF DESCRIPTION OF THE DRAWINGS

An exemplary embodiment of the present disclosure will be described in detail based on the following figures, wherein:

FIG. 6 is a diagram illustrating an example of list items displayed on a copy setting screen;

FIG. 10 is a diagram illustrating an example of a visible range during the scrolling;

DETAILED DESCRIPTION

Next, an exemplary embodiment of the present disclosure will be described in detail hereinafter with reference to the drawings.

Figure 1:
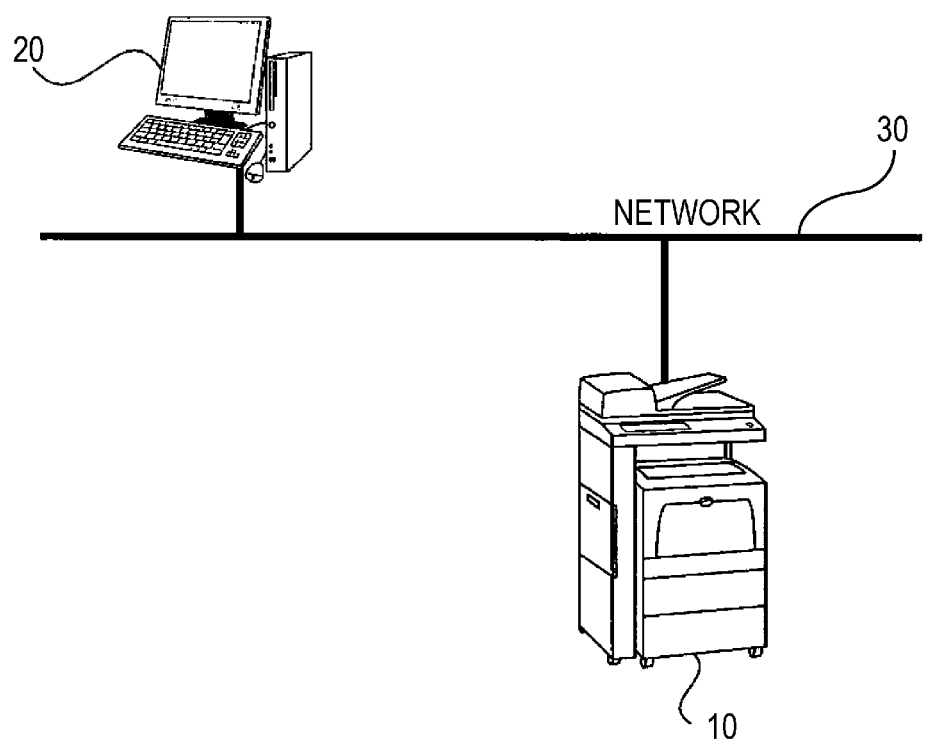
FIG. 1 is a diagram illustrating the configuration of an image forming system according to an exemplary embodiment of the present disclosure.

FIG. 1 is a diagram illustrating the configuration of an image forming system according to the exemplary embodiment of the present disclosure.

As illustrated in FIG. 1, the image forming system according to the exemplary embodiment of the present disclosure includes an image forming apparatus 10 and a terminal apparatus 20 connected to each other by a network 30. The terminal apparatus 20 generates print data and transmits the print data to the image forming apparatus 10 through the network 30. The image forming apparatus 10 receives the print data transmitted from the terminal apparatus 20 and outputs an image according to the print data onto a sheet. The image forming apparatus 10 is a so-called "multifunction peripheral (MFP)" having a plurality of functions such as a print function, a scan function, a copy function, and a fax function.

Next, the hardware configuration of the image forming apparatus 10 in the image forming system according to the present exemplary embodiment will be described with reference to FIG. 2.

Figure 2:
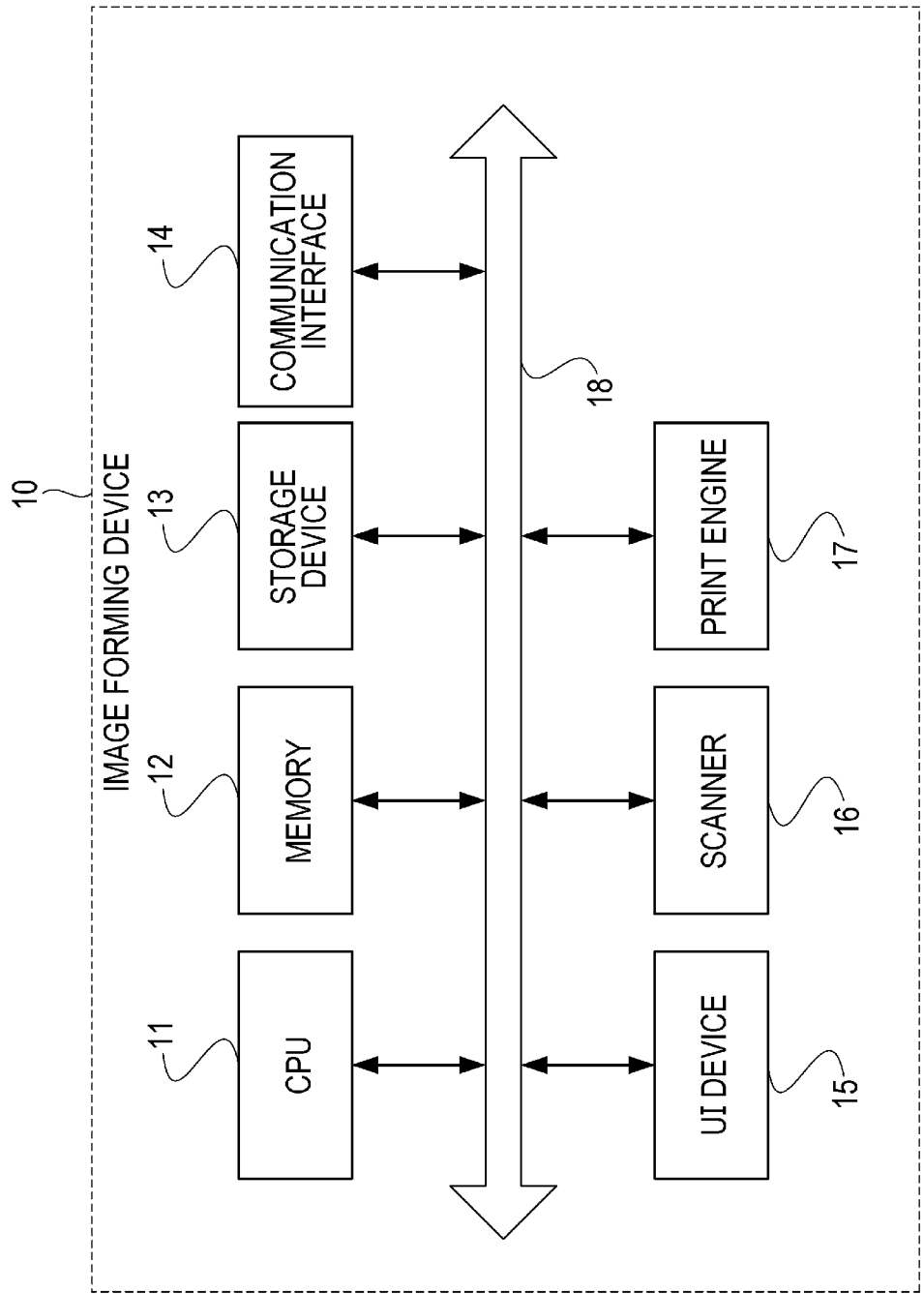
FIG. 2 is a block diagram illustrating the hardware configuration of an image forming apparatus according to the exemplary embodiment of the present disclosure.

As illustrated in FIG. 2, the image forming apparatus 10 includes a central processing unit (CPU) 11, a memory 12, a storage device 13 such as a hard disk drive (HDD), a communication interface 14 that communicates data with external apparatuses through the network 30, a user interface (UI) device 15 that includes a touch panel or a liquid crystal display and a keyboard, a scanner 16, and a print engine 17. These components are connected to one another by a control bus 18.

The print engine 17 prints an image on a recording medium such as printing paper through processes such as charging, exposure, developing, transfer, and fixing.

The CPU 11 performs a certain process on the basis of a control program stored in the memory 12 or the storage device 13 to control the operation of the image forming apparatus 10.

Although the CPU 11 reads the control program stored in the memory 12 or the storage device 13 and executes the control program in the present exemplary embodiment, the control program may be stored in a storage medium such as a compact disc read-only memory (CD-ROM) and provided for the CPU 11, instead.

Figure 3:
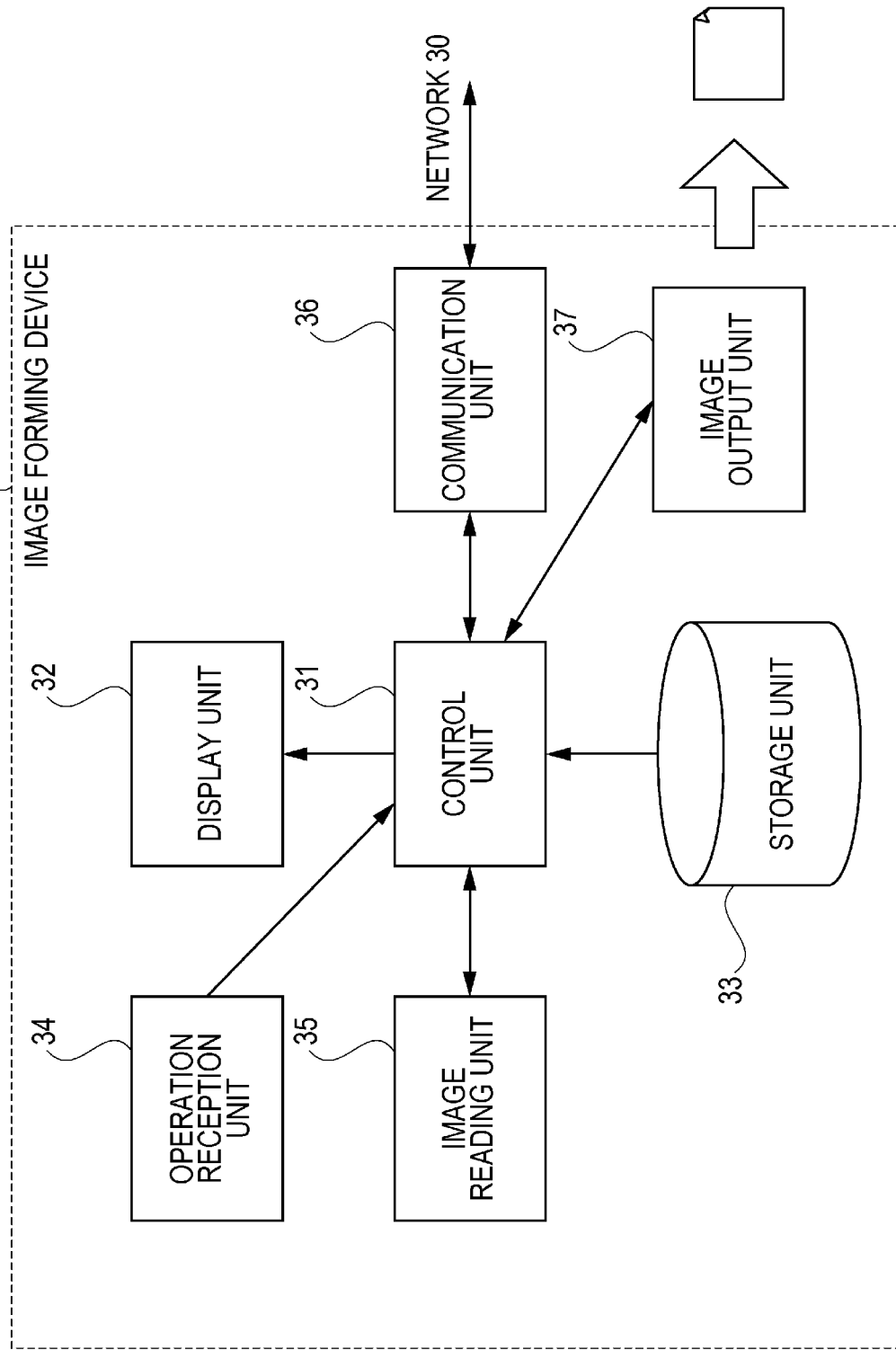
FIG. 3 is a block diagram illustrating the functional configuration of the image forming apparatus according to the exemplary embodiment of the present disclosure.

FIG. 3 is a block diagram illustrating the functional configuration of the image forming apparatus 10 achieved by executing the control program.

As illustrated in FIG. 3, the image forming apparatus 10 according to the present exemplary embodiment includes a control unit 31, a display unit 32, a storage unit 33, an operation reception unit 34, an image reading unit 35, a communication unit 36, and an image output unit 37.

The communication unit 36 receives a print job (print instruction) transmitted from the terminal apparatus 20 or the like through the network 30.

The control unit 31 generates print data on the basis of a print job received through the communication unit 36, a document image read by the image reading unit 35, or the like and outputs, from the image output unit 37, the print data onto a recording medium such as printing paper. The storage unit 33 stores various pieces of data such as print data generated by the control unit 31.

The display unit 32 is controlled by the control unit 31 and displays various pieces of information for a user. The operation reception unit 34 receives various pieces of information regarding operations performed by the user. The display unit 32 has a touch panel function, and the operation reception unit 34 receives user instructions based on touch operations performed on the display unit 32.

The control unit 31 functions as a display control unit that controls information displayed on the display unit 32. If the operation reception unit 34 receives an instruction to scroll through a plurality of list items when the plurality of list items are displayed in a certain display area of the display unit 32, the control unit 31 controls the display unit 32 such that the plurality of list items are scrolled in the display area.

If the user selects a certain list item from the plurality of list items, the control unit 31 controls the display unit 32 such that the certain list item is fixed at an end of the display area in a scrolling direction. In the present exemplary embodiment, a part of the display area in which the certain list item is fixed will be referred to as a "fixed part".

More specifically, when the certain list item has reached the end of the display area in the scrolling direction as a result of scrolling, the control unit 31 controls the display unit 32 such that the certain list item is fixed at the end of the display area.

If the display area enters a predetermined state as a result of a user instruction received by the operation reception unit 34, the control unit 31 controls the display unit 32 in such a way as to reduce in size the certain list item fixed at the end of the display area and increase in size an area in which the list items can scroll.

The predetermined state of the display area refers to a state in which the area in which the list items can be scrolled has become relatively small in the display area so that it is difficult for the user to scroll through the list items.

More specifically, the display area enters the predetermined state if a ratio of the size of the area in which the certain list item is fixed to the size of the entirety of the display area has become equal to or lower than a predetermined value or if the number of list items displayed in the scrollable area has become equal to or smaller than a predetermined value, namely, for example, three.

If the display area enters the predetermined state as described above, the control unit 31 controls the display unit 32 in such a way as to reduce in size the certain list item fixed at the end of the display area and increase in size the area in which the list items can scroll.

In the present exemplary embodiment, if the size of the part of the display area in which the certain list item is fixed becomes equal to or larger than a certain value, the control unit 31 controls the display unit 32 in such a way as to reduce in size the certain list item fixed in the fixed part and increase in size the area in which the list items can scroll.

Alternatively, if the size of the part of the display area in which the list items can be scrolled becomes smaller than a predetermined value, the control unit 31 may control the display unit 32 in such a way as to reduce in size the certain list item fixed in the fixed part and increase in size the area in which the list items can scroll.

If the operation reception unit 34 receives an instruction to scroll through the list items after the size of the part of the display area in which the list items can be scrolled becomes equal to or smaller than the predetermined value, for example, the control unit 31 may control the display unit 32 in such a way as to reduce in size the certain list item fixed in the fixed part and increase in size the area in which the list items can be scrolled.

Alternatively, if one of the list items is selected after the size of the part of the display area in which the list items can be scrolled becomes equal to or smaller than the predetermined value, the control unit 31 may control the display unit 32 in such a way as to increase in size the certain list item fixed in the fixed part and increase in size the area in which the list items can be scrolled.

Alternatively, if the certain list item selected by the user reaches the end of the display area in the scrolling direction as a result of scrolling, the control unit 31 may control the display unit 32 in such a way as to reduce the certain list item in size and keep displaying the certain list item in the fixed part at the end of the display area.

In addition, the control unit 31 may reduce the certain list item in size in the fixed part by displaying only an item name of the certain list item.

Alternatively, the control unit 31 may reduce the certain list item in size in the fixed part by displaying an icon or another symbol for the certain list item.

Alternatively, the control unit 31 may reduce the certain list item in size in the fixed part by displaying an icon (symbol) that indicates a setting for the certain list item.

In the image forming apparatus 10 according to the present exemplary embodiment, the operation reception unit 34 and the display unit 32 are integrated with each other as an operation panel by employing a touch panel.

Figure 4:
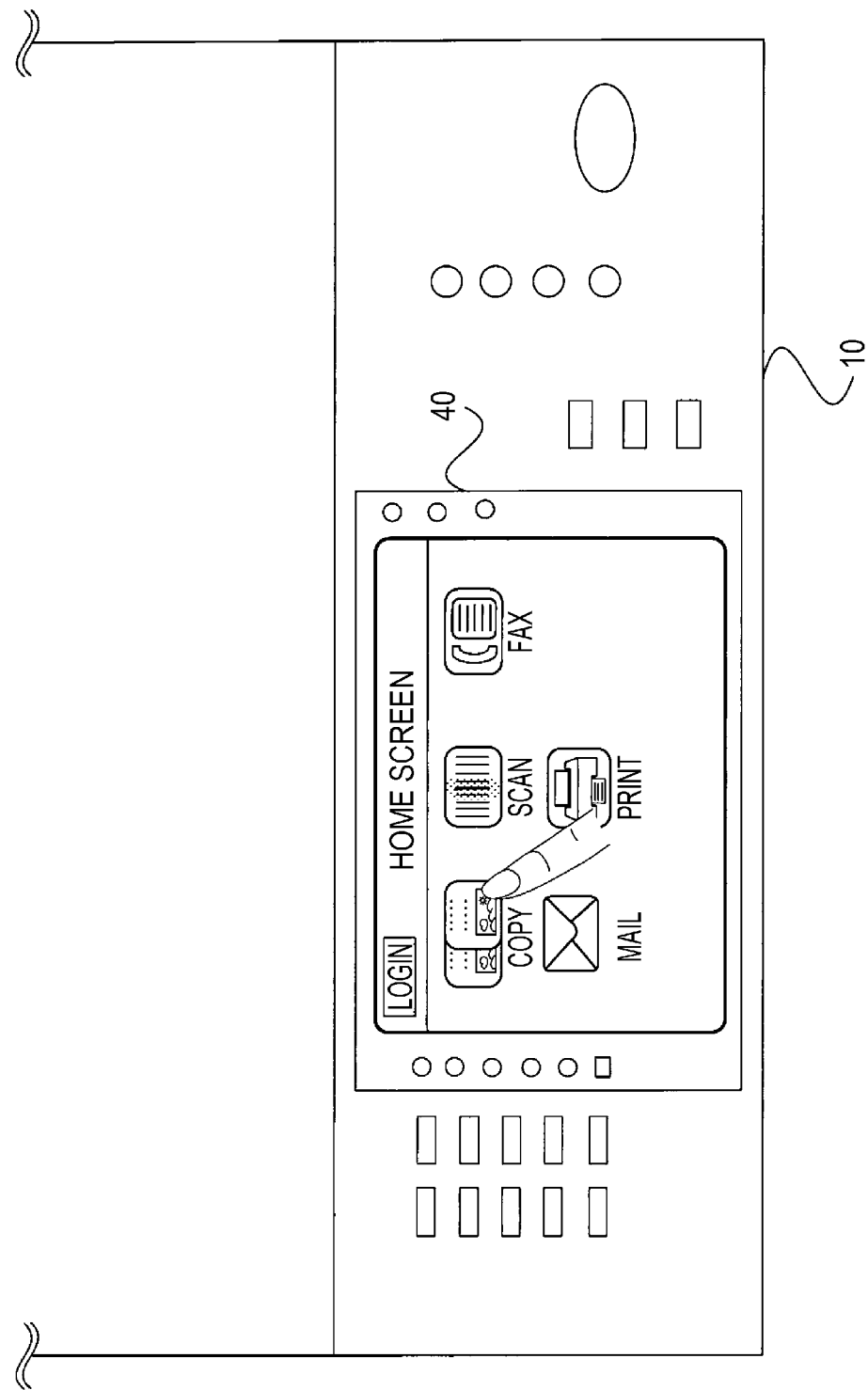
FIG. 4 is a diagram illustrating an example of an operation panel, which is a touch panel.

FIG. 4 illustrates an example of an operation panel 40, which is a touch panel. In FIG. 4, the operation panel 40 including a touch panel is provided on an operation board of the image forming apparatus 10.

Next, a copy process performed by the user using the operation panel 40 will be described with reference to the drawings.

In FIG. 4, the user touches a copy icon displayed on a home screen. If the user touches the copy icon, the operation panel 40 displays an operation screen illustrated in FIG. 5.

Figure 5:
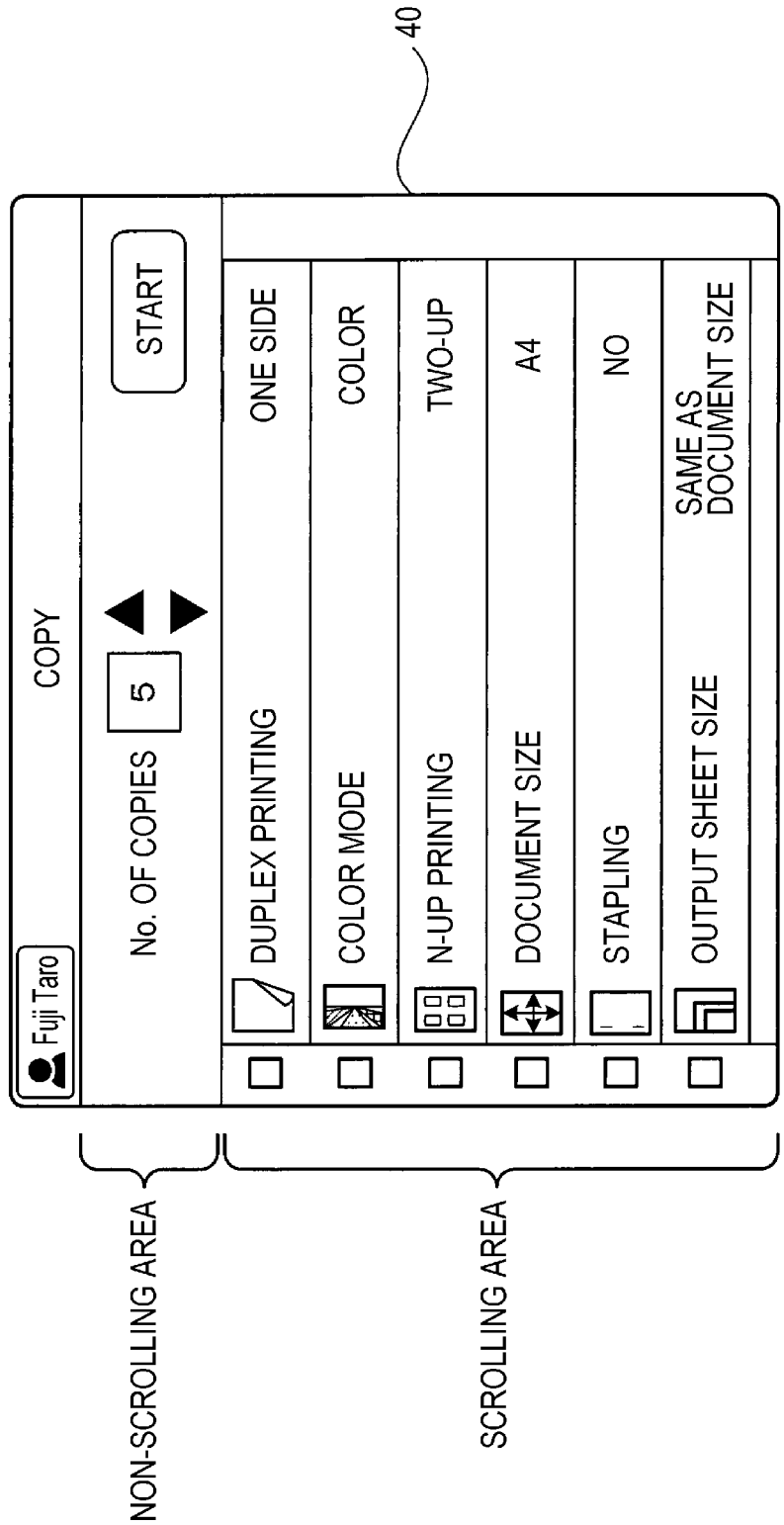
FIG. 5 is a diagram illustrating an example of an operation screen for making various settings for performing a copy process.

An example of the operation screen illustrated in FIG. 5 is used to make various settings for performing the copy process.

Various setting items are provided for copying and displayed on the operation screen as list items. As illustrated in FIG. 6, however, various list items are displayed on a copy setting screen. The operation screen illustrated in FIG. 5, therefore, includes a scrolling area in which the large number of list items illustrated in FIG. 6 are scrolled and a non-scrolling area in which a setting item or the like remains displayed without being scrolled.

"Scrolling" refers to, when it is difficult to display a plurality of list items in a limited display area (window) at once, a method for displaying these list items on a screen by sliding the list items vertically or horizontally. In scrolling, list items are slid vertically or horizontally through an operation performed on a scroll bar, a scroll button, or the like. When scrolling is performed on a touch panel, list items are slid vertically or horizontally through flicking or swiping.

Figure 7:
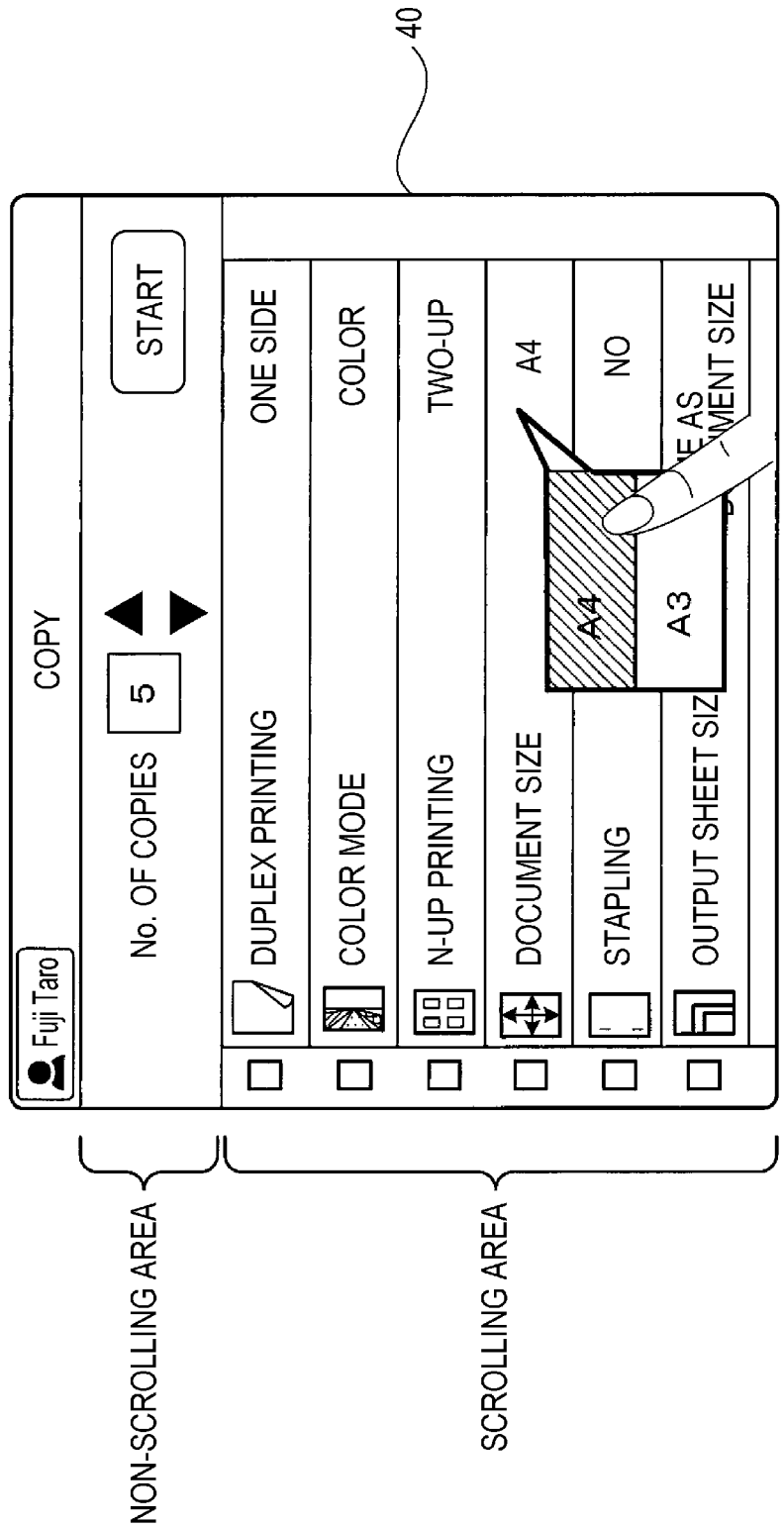
FIG. 7 is a diagram illustrating an operation performed by a user to change a setting of a displayed list item.

In the operation screen illustrated in FIG. 5, the number of copies to be printed, which needs to be set before copying, is disposed in the non-scrolling area, and the other setting items are displayed in the scrolling area as list items. If the user desires to change a setting of a displayed list item, the user touches the list item as illustrated in FIG. 7.

The list items illustrated in FIG. 5 each include an item name, an icon (symbol) indicating the list item, and a current setting.

Figure 8:
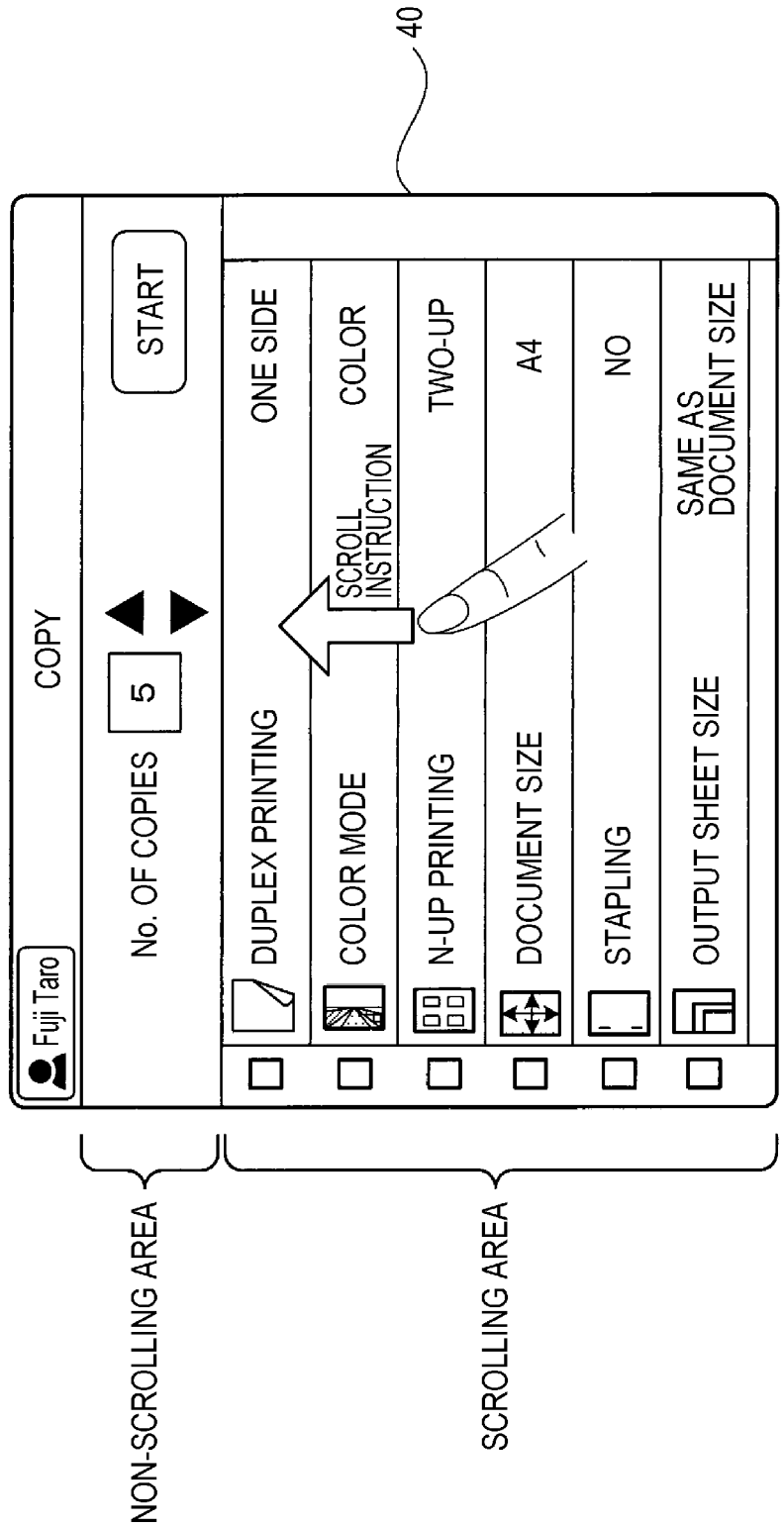
FIG. 8 is a diagram illustrating an operation performed by the user to issue a scroll instruction to start scrolling.

If a list item whose setting the user desires to change is not displayed in the scrolling area, the user issues a scroll instruction by performing an operation illustrated in FIG. 8.

Figure 9:
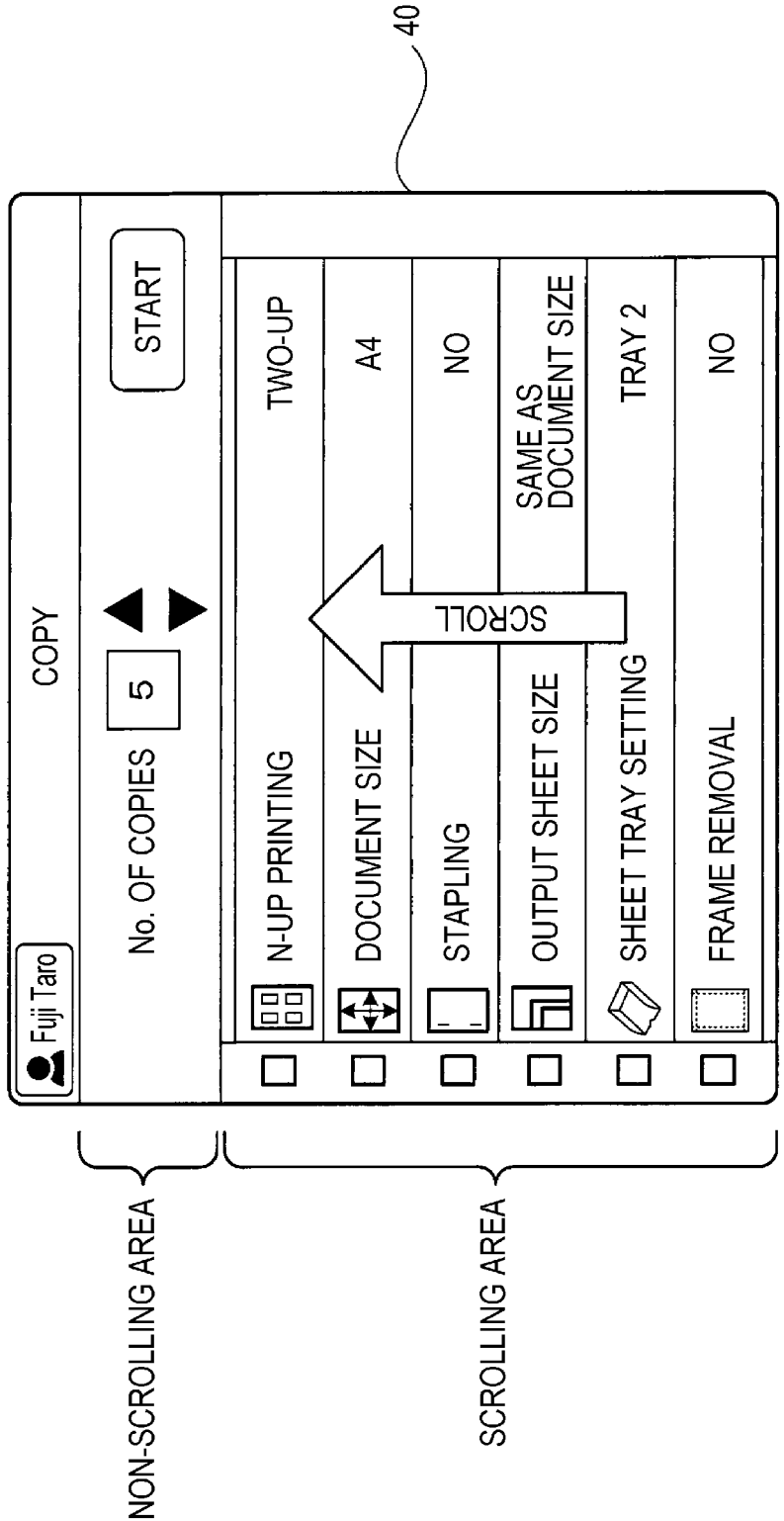
FIG. 9 is a diagram illustrating the scrolling of list items in a scrolling area.

If the user issues the scroll instruction illustrated in FIG. 8 to perform scrolling, the list items are scrolled and list items that have been hidden are sequentially displayed on the operation screen in the scrolling area as illustrated in FIG. 9. When the list item whose setting the user desires to change appears, the user stops the scrolling and changes the setting of the list item.

As a result of the scrolling, list items in a visible range are displayed, and list items in an invisible range are hidden as illustrated in FIG. 10. That is, the visible range vertically moves as a result of the scrolling, and only list items in the visible range area displayed on the operation screen in the scrolling area.

If scrolling is performed as illustrated in FIG. 9 and the user performs the scrolling through flicking, inertial scrolling, in which scrolling continues even after the user releases his/her finger from the operation panel 40, is usually performed. Scrolling speed and the duration of the scrolling after the user releases his/her finger are determined in accordance with the moving speed of the finger during the flicking.

If the user starts scrolling through a quick flick, therefore, scrolling speed becomes high, and a target list item might pass. If the visible range reaches a lower end of the scrolling area in a scrolling direction as a result of vertical scrolling of the list items, the scrolling stops with lowest list items within the visible range displayed as illustrated in FIG. 11.

Through scrolling, a large number of list items are displayed in a limited scrolling area, and settings can be changed or checked.

With this kind of scrolling, however, all list items are not displayed simultaneously. When the user desires to scroll through list items while checking a setting of a certain list item or when the user desires to simultaneously check settings of a plurality of list items that are not displayed in a single visible range, therefore, such kind of scrolling might be inconvenient.

Figure 11:
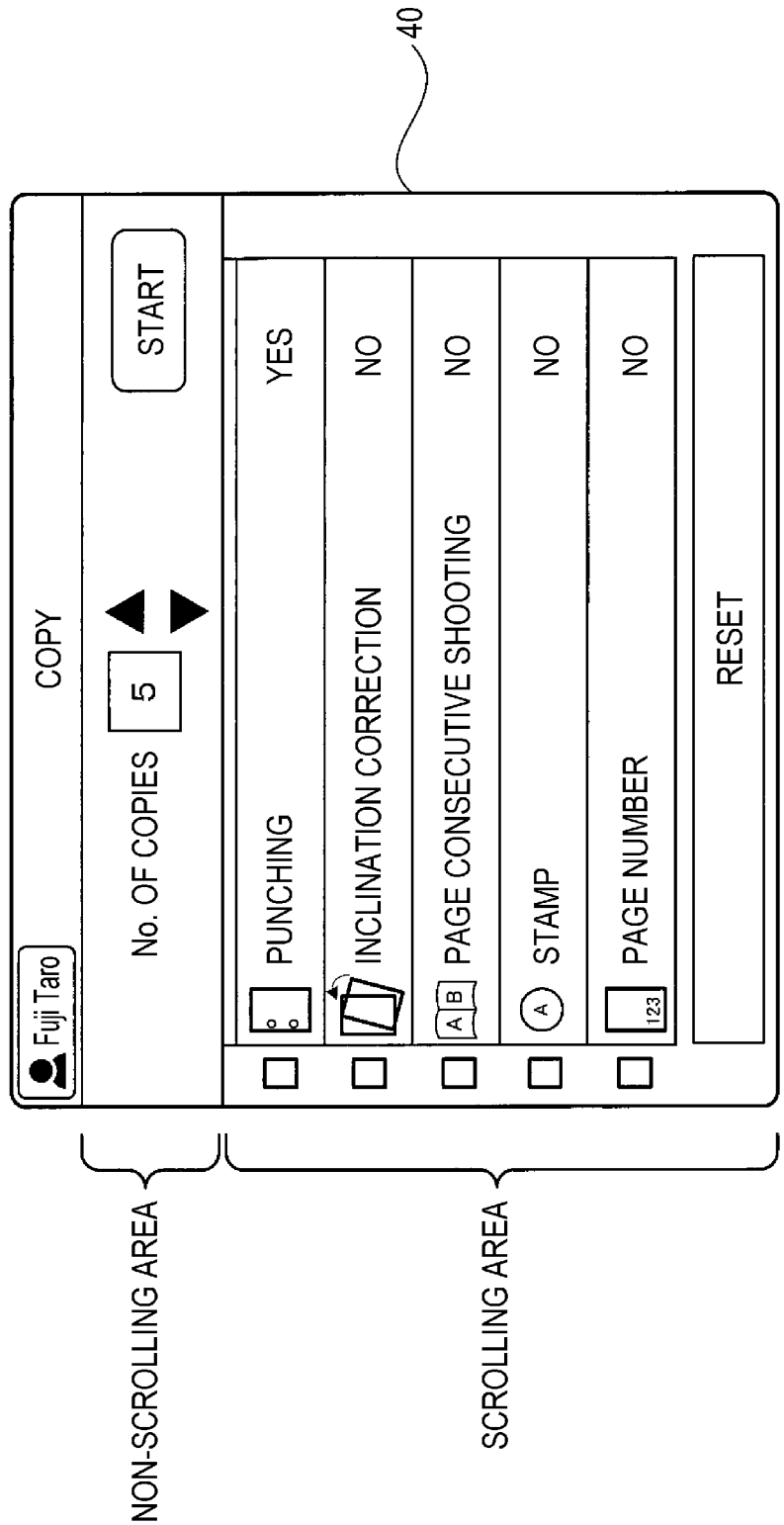
FIG. 11 is a diagram illustrating an example of an operation screen at a time when the visible range has reached a lower end of the scrolling area as a result of upward scrolling.

For example, if the user desires to check whether a color mode is "color" or "black-and-white" before pressing a start button to perform copying after changing and checking settings of list items on the operation screen illustrated in FIG. 11, the user needs to scroll through the list items upward to display a list item of "color mode". If the user then desires to check whether a list item of "inclination correction" is "yes" or "no", the user needs to scroll through the list items downward to display the list item of "inclination correction". That is, the user needs to perform multiple operations.

In the present exemplary embodiment, the user is enabled to select a list item that is to remain displayed. As a result, in the image forming apparatus 10 according to the present exemplary embodiment, the list item selected by the user remains displayed without entering the invisible range, even if the user scroll through list items.

FIGS. 12 to 15 illustrate examples of an operation screen at a time when the user has selected a certain list item. In the present exemplary embodiment, a checkbox is provided to the left of each list item in the scrolling area of the operation screen, and the user selects a list item by touching a corresponding checkbox.

Figure 12:
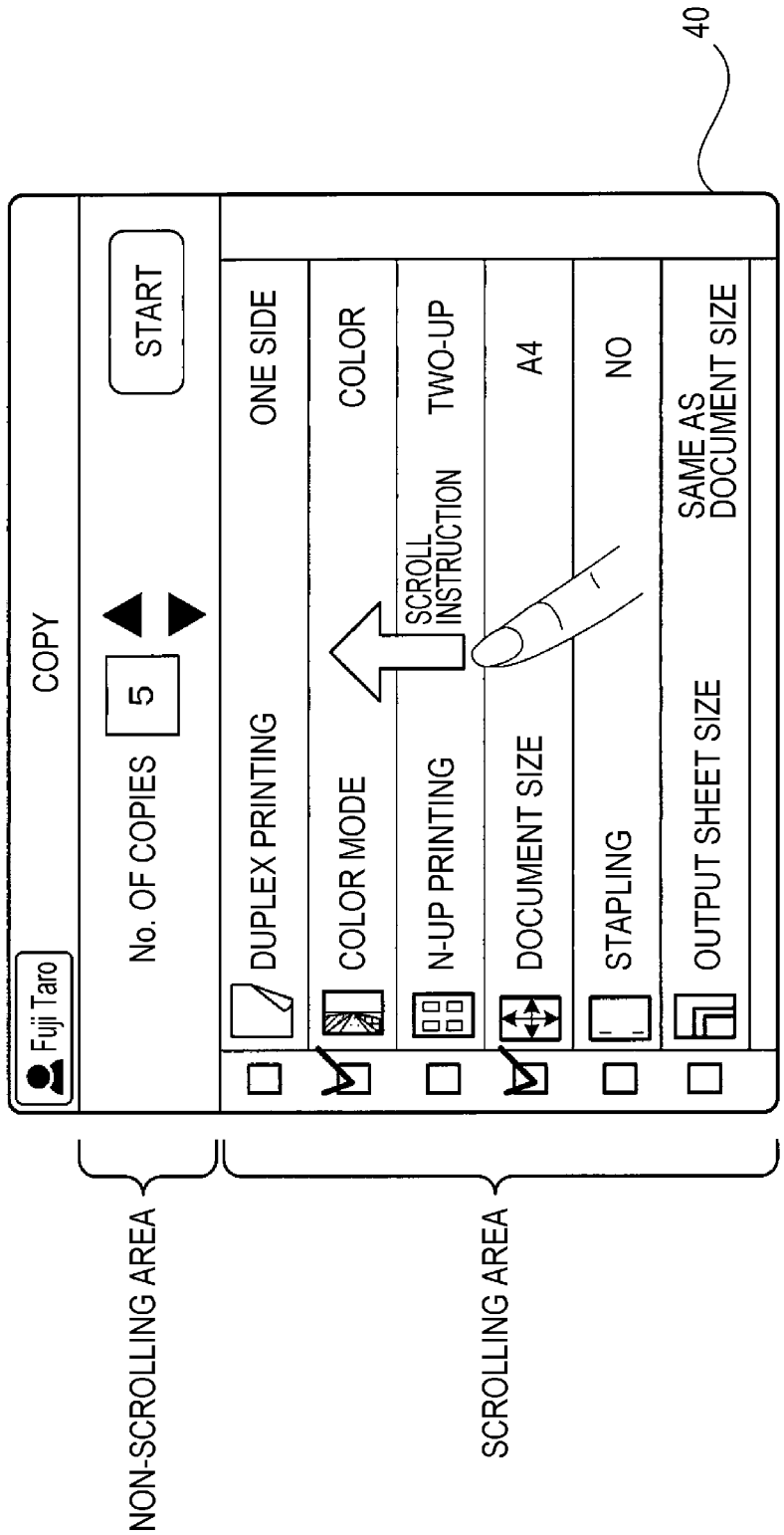
FIG. 12 is a diagram illustrating an example of an operation screen at a time when the user has selected a certain list item from the plurality of list items.

In the following description, a case where the user has selected list items of "color mode" and "document size" will be described as illustrated in FIG. 12.

The control unit 31 controls the display unit 32 such that the selected list items of "color mode" and "document size" are fixed at an upper end of the scrolling area in the scrolling direction when the selected list items have reached the upper end as a result of scrolling.

Figure 13:
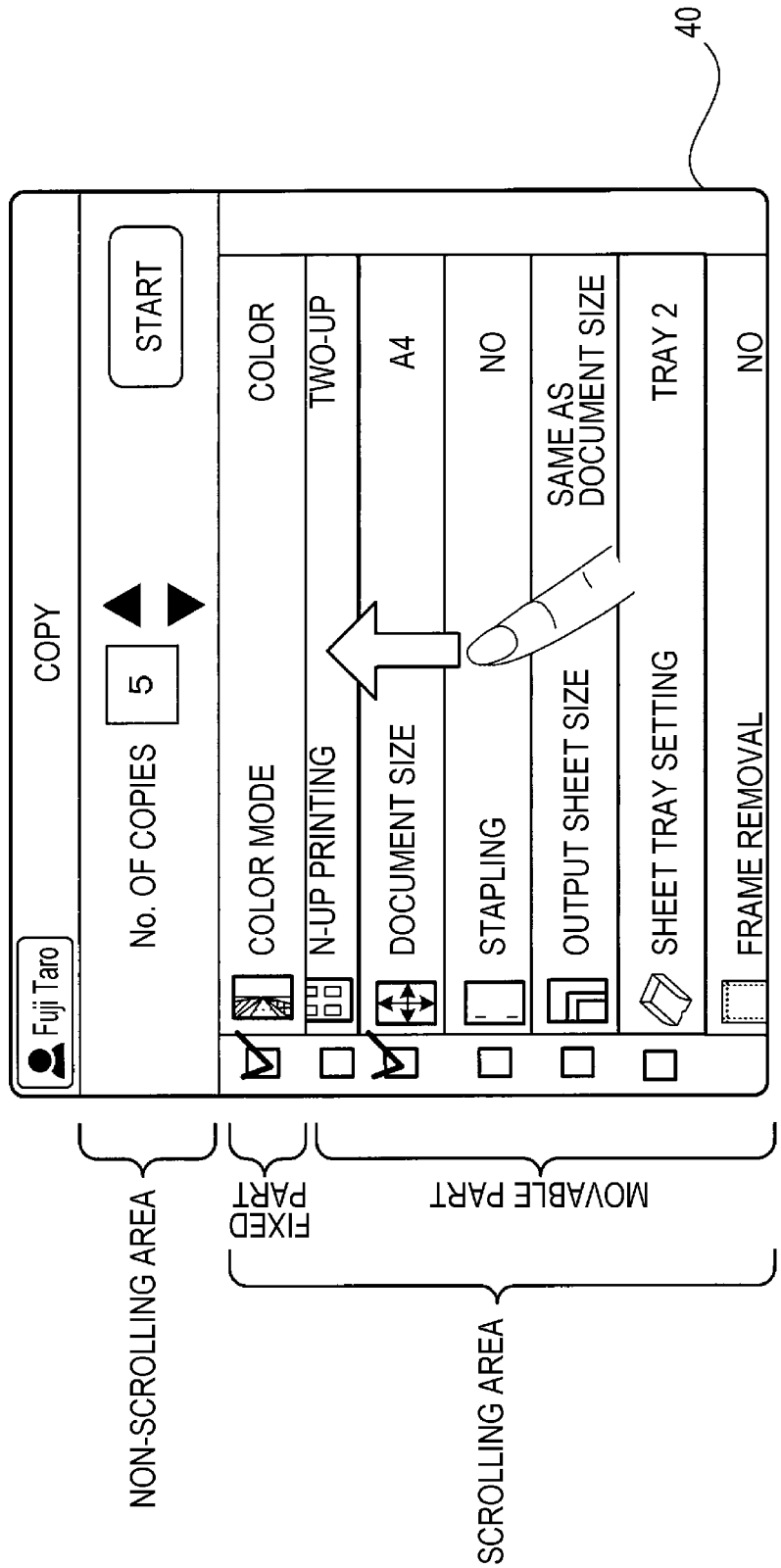
FIG. 13 is a diagram illustrating another example of the operation screen at a time when the user has selected a certain list item from the plurality of list items.

If the user issues a scroll instruction as illustrated in FIG. 12 with the list items of "color mode" and "document size" selected, scrolling starts. When the list item of "color mode"

has reached the upper end of the scrolling area as illustrated in FIG. 13, the list item is fixed. That is, the list item of "color mode" remains displayed at a certain position as other list items move upward as a result of the scrolling.

Now, a part of the scrolling area in which a list item is fixed regardless of scrolling will be referred to as a "fixed part". A part of the scrolling area other than the fixed part will be referred to as a "movable part". The movable part is an area in which list items can be scrolled.

Figure 14:
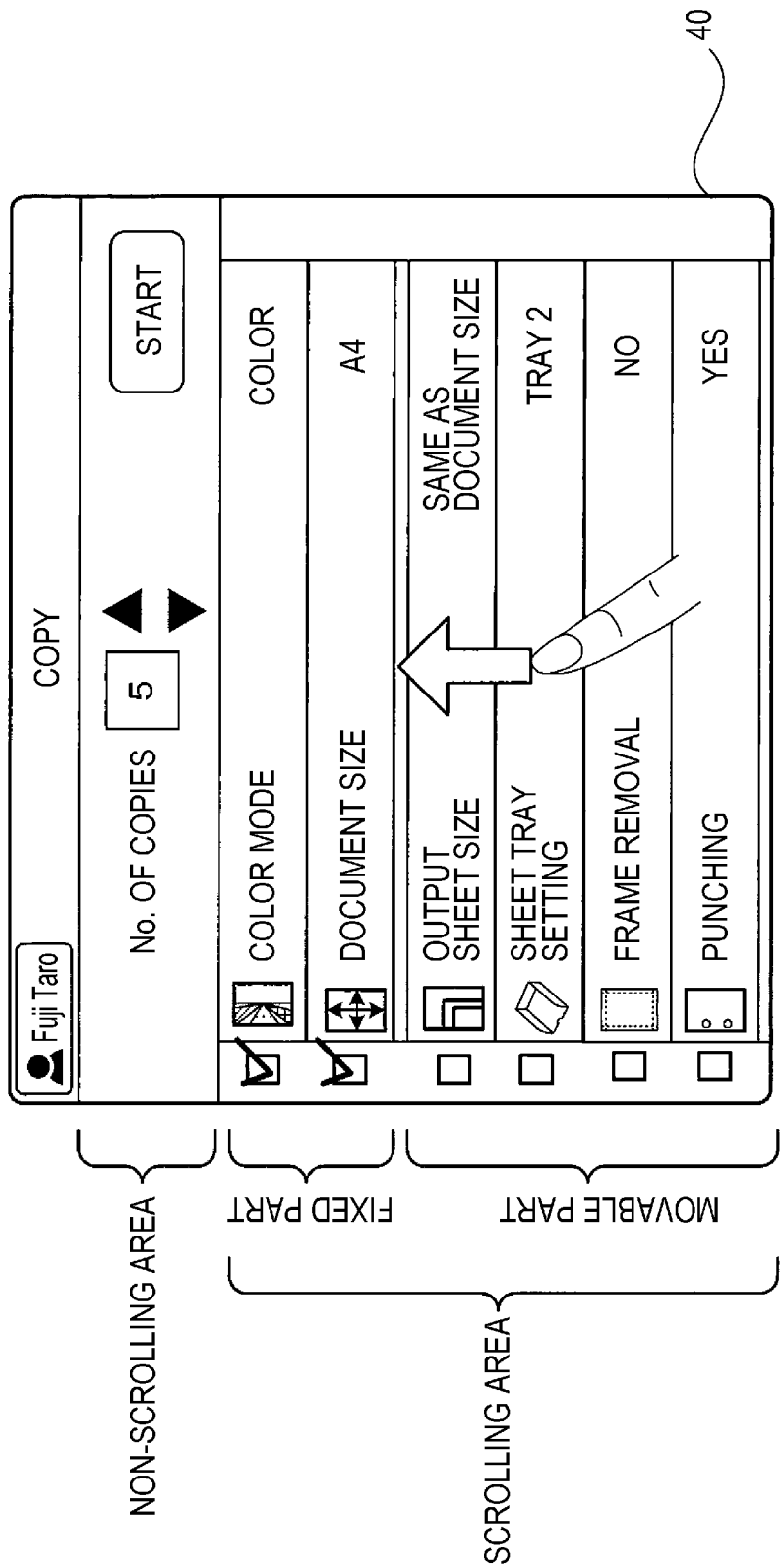
FIG. 14 is a diagram illustrating another example of the operation screen at a time when the user has selected a certain list item from the plurality of list items.

If scrolling is further performed in the operation screen illustrated in FIG. 13 and the list item of "document size" reaches an upper end of the movable part of the scrolling area as illustrated in FIG. 14, the list item of "document size" is fixed as with the list item of "color mode". That is, the two list items of "color mode" and "document size" are fixed in the fixed part regardless of scrolling.

As a result, the user can scroll through list items while checking settings of the list items of "color mode" and "document size".

It is usually likely that an operation button and the like to be paid attention to are displayed in an upper part of the operation screen. More specifically, in the case of copying as in the present exemplary embodiment, information to be paid attention to, such as the number of copies to be printed and a start button, is displayed near the upper end of the scrolling area. By fixing, at the upper end of the scrolling area, a list item selected by the user as a list item whose setting the user desires to check, the selected list item is fixed near the information to be paid attention to, such as the operation button. The user can therefore perform operations on the operation buttons and the like while checking the setting of the selected list item.

When such information is displayed near the lower end of the scrolling area, a list item selected by the user as a list item whose setting the user desires to check may be fixed at the lower end of the scrolling area. In this case, the user can easily check the information and the setting of the list item.

In the case of vertical scrolling according to the present exemplary embodiment, the scrolling starts at the upper end. The user usually thinks that information to be paid attention to is displayed or disposed near a position at which scrolling starts. By fixing a list item selected by the user as a list item whose setting the user desires to check at the upper end, at which scrolling starts, therefore, it becomes convenient for the user to check the setting of the fixed list item.

Even in the case of horizontal scrolling, the same effect is produced by fixing a list item at an end at which the scrolling starts or at which information to be paid attention to is disposed.

Figure 15:
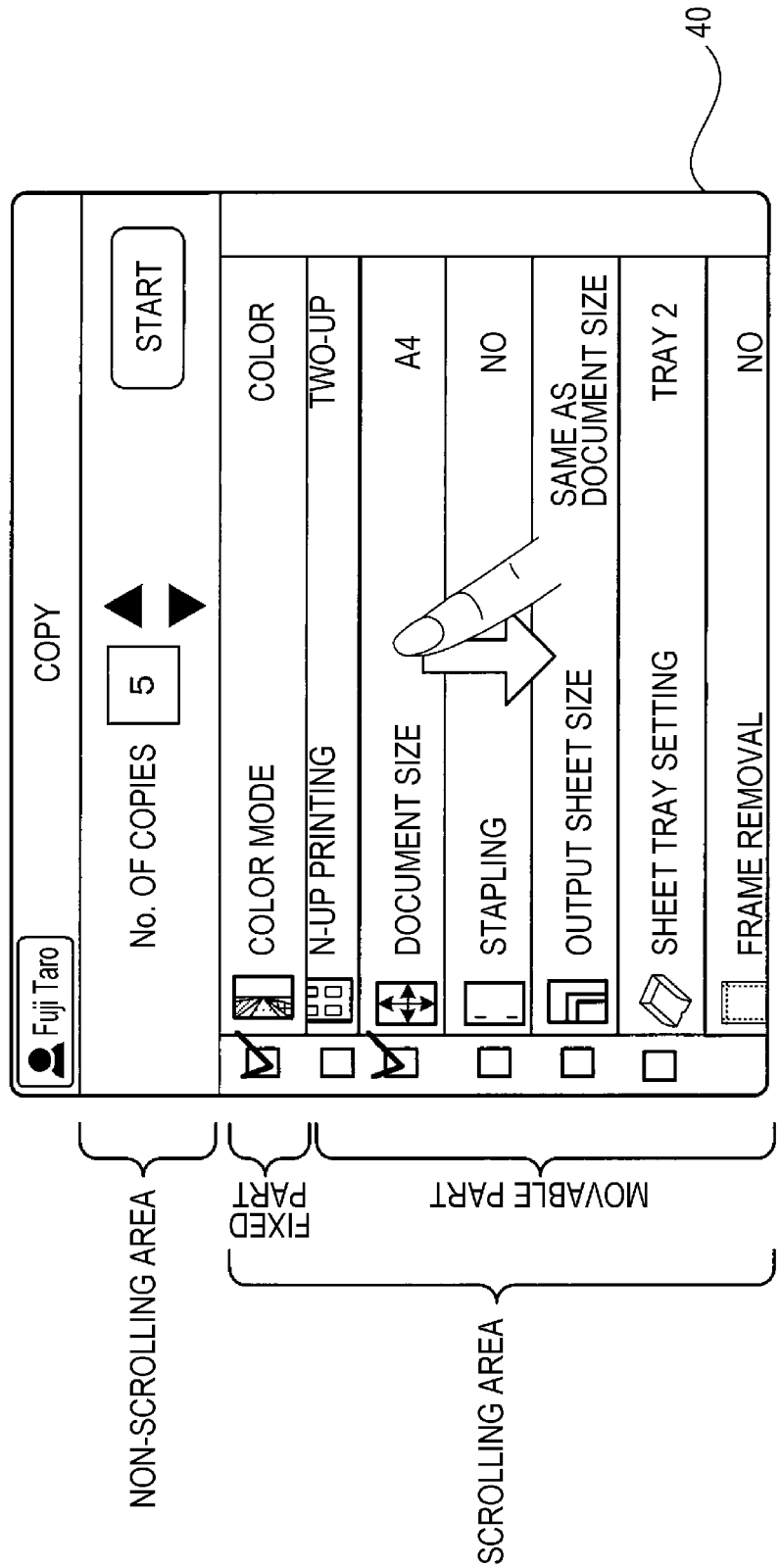
FIG. 15 is a diagram illustrating another example of the operation screen at a time when the user has selected a certain list item from the plurality of list items.

FIG. 15 illustrates the operation screen at a time when the user has issued a reverse scroll instruction, that is, a downward scroll instruction, in the state illustrated in FIG. 14. In the operation screen illustrated in FIG. 15, the visible range includes the list item of "document size" as a result of downward scrolling, and the list item of "document size" that was displayed in the fixed part can now be scrolled through at an original position along with the other list items.

If downward scrolling is further performed on the operation screen illustrated in FIG. 15, the list item of "color mode" is also scrolled at an original position along with the other list items.

If the user selects a certain list item whose setting the user desires to constantly check from a plurality of list items, the selected list item remains displayed at some position on the operation screen even if scrolling is performed.

Figure 16:
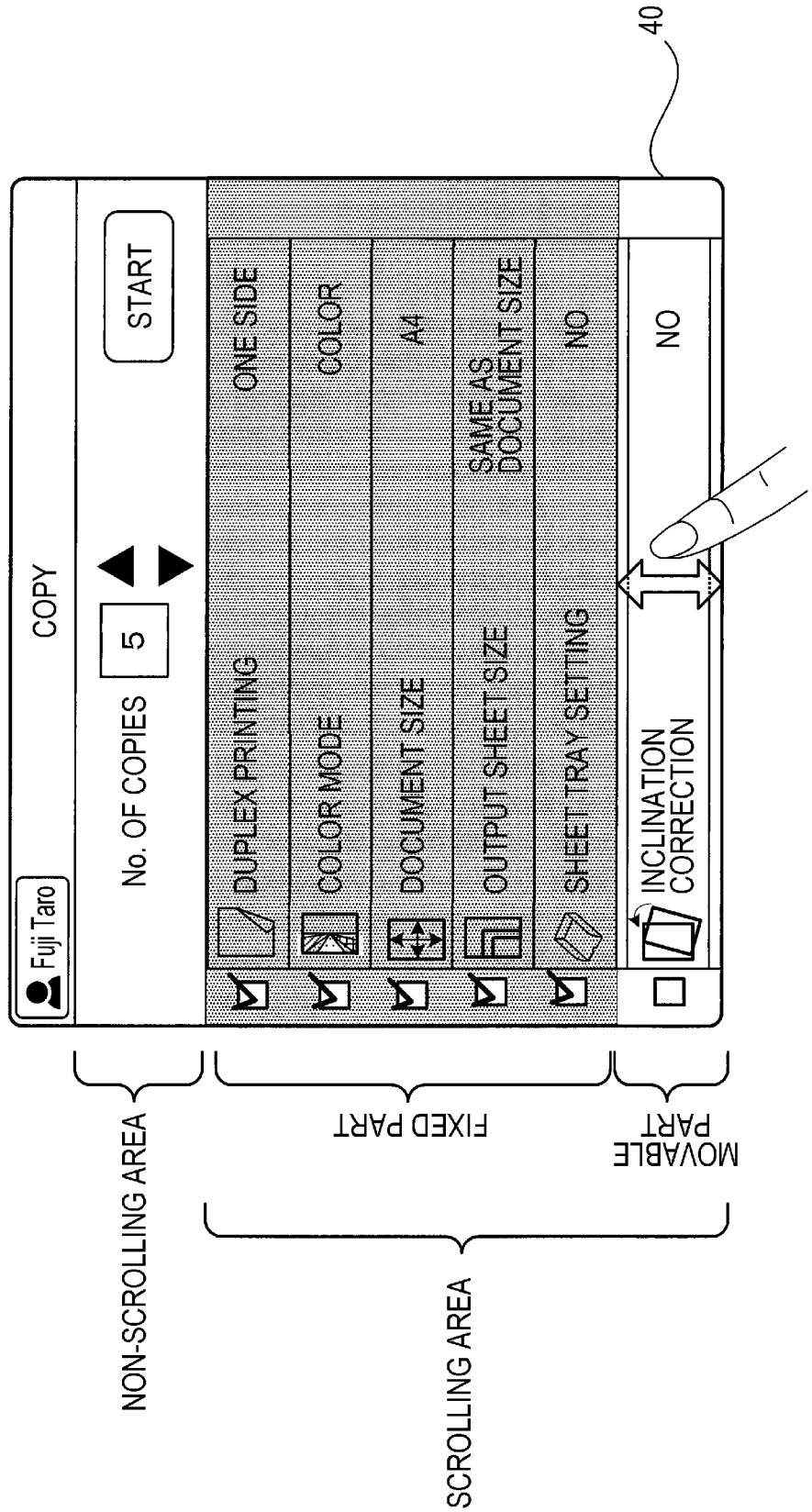
FIG. 16 is a diagram illustrating an example of an operation screen at a time when the user has selected five list items from the plurality of list items.

If the number of list items selected by the user becomes large as illustrated in FIG. 16, however, the fixed part might become large, and the movable part, in which scrolling can be performed, might become too small. In an example of an operation screen illustrated in FIG. 16, the user has selected five list items of "duplex printing", "color mode", "document size", "output sheet size", and "sheet tray setting" as list items that are to remain displayed. Although the fixed part is hatched for the sake of convenience in FIG. 16, the movable part and the fixed part are displayed in the same color on an actual operation screen.

In the example of the operation screen illustrated in FIG. 16, the movable part is small, and only one list item is included in the visible range even if the user performs scrolling.

In the image forming apparatus 10 according to the present exemplary embodiment, if the size of the fixed part becomes equal to or larger than a predetermined value, that is, if the size of the movable part, in which scrolling can be performed, becomes equal to or smaller than a predetermined value, the fixed part is reduced in size and the movable part is increased in size.

FIGS. 17 to 20 illustrate examples of an operation screen at a time when the fixed part is reduced in size.

Figure 17:
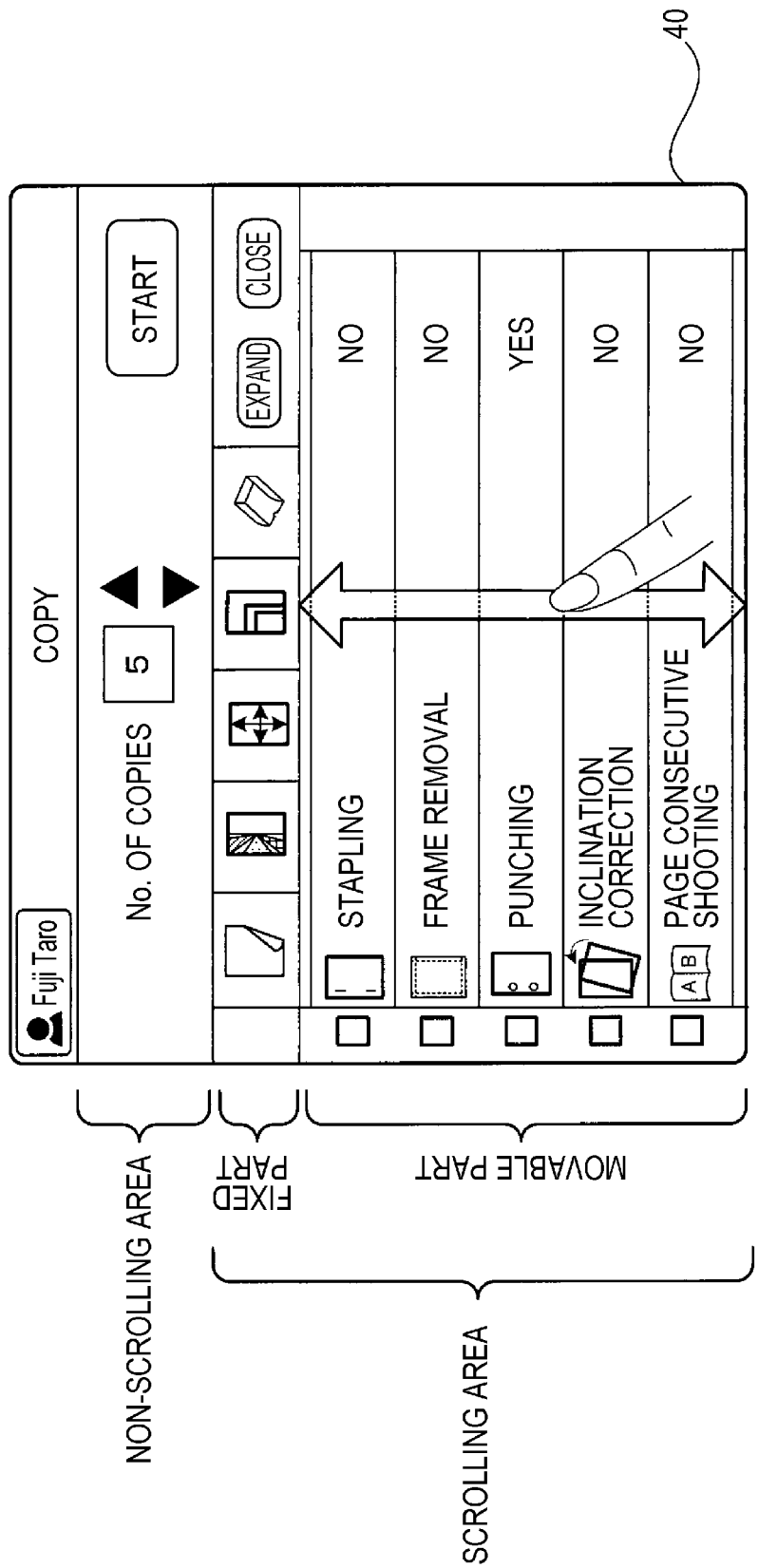
FIG. 17 is a diagram illustrating an example of an operation screen at a time when a fixed part has been reduced in size by displaying only icons.

In the example of the operation screen illustrated in FIG. 17, only icons (symbols) indicating list items are displayed in the fixed part to reduce the fixed part in size.

In the example of the operation screen illustrated in FIG. 17, it can be seen that the fixed part has been reduced in size and the movable part has been increased in size.

Figure 18:
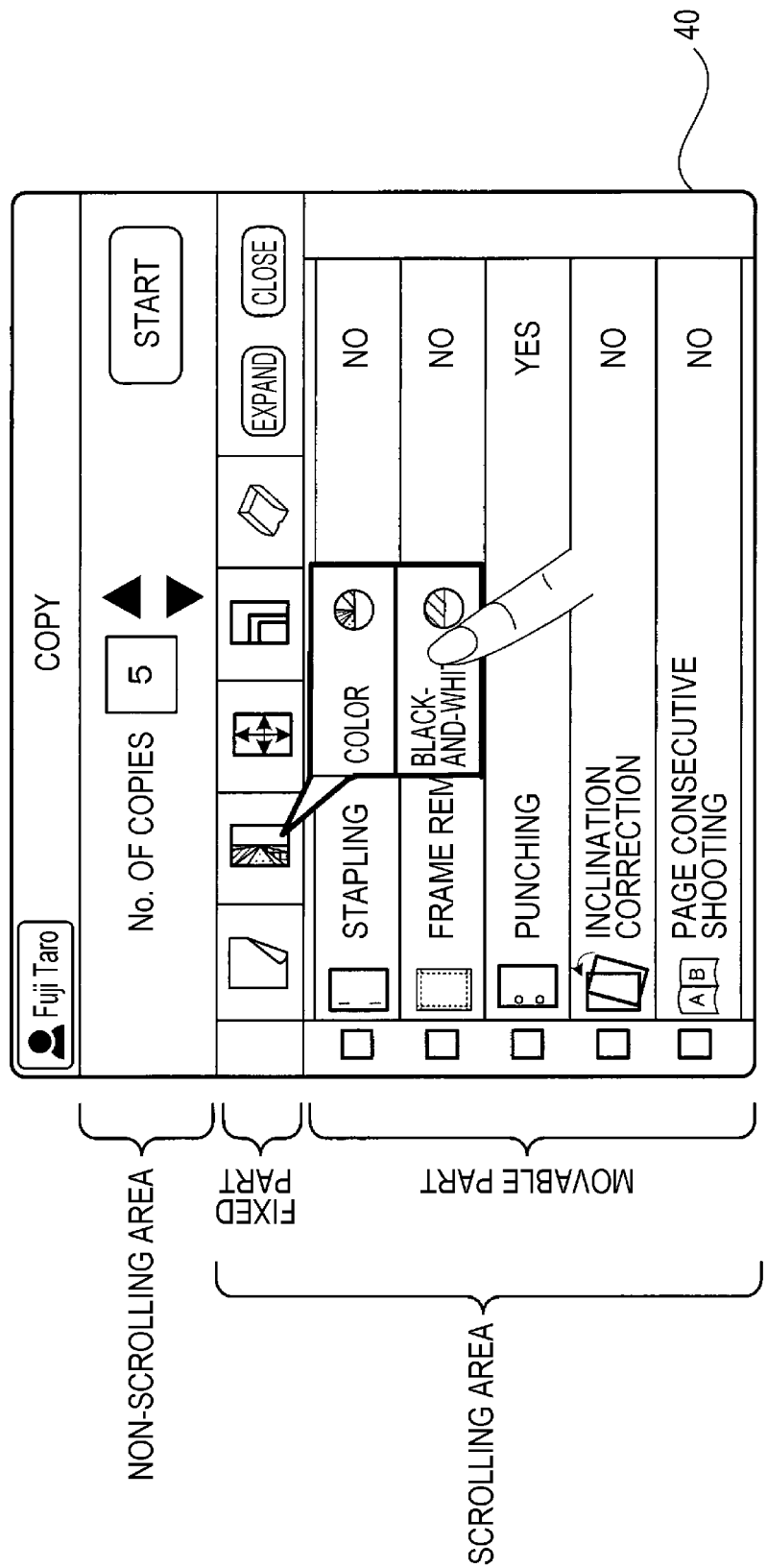
FIG. 18 is a diagram illustrating an operation for changing a setting of a list item in the operation screen illustrated in FIG. 17.

If the user desires to change a setting of a list item displayed in the fixed part, the user touches an operation button including an icon indicating the list item as illustrated in FIG. 18 and changes the setting in a displayed popup menu.

Figure 19:
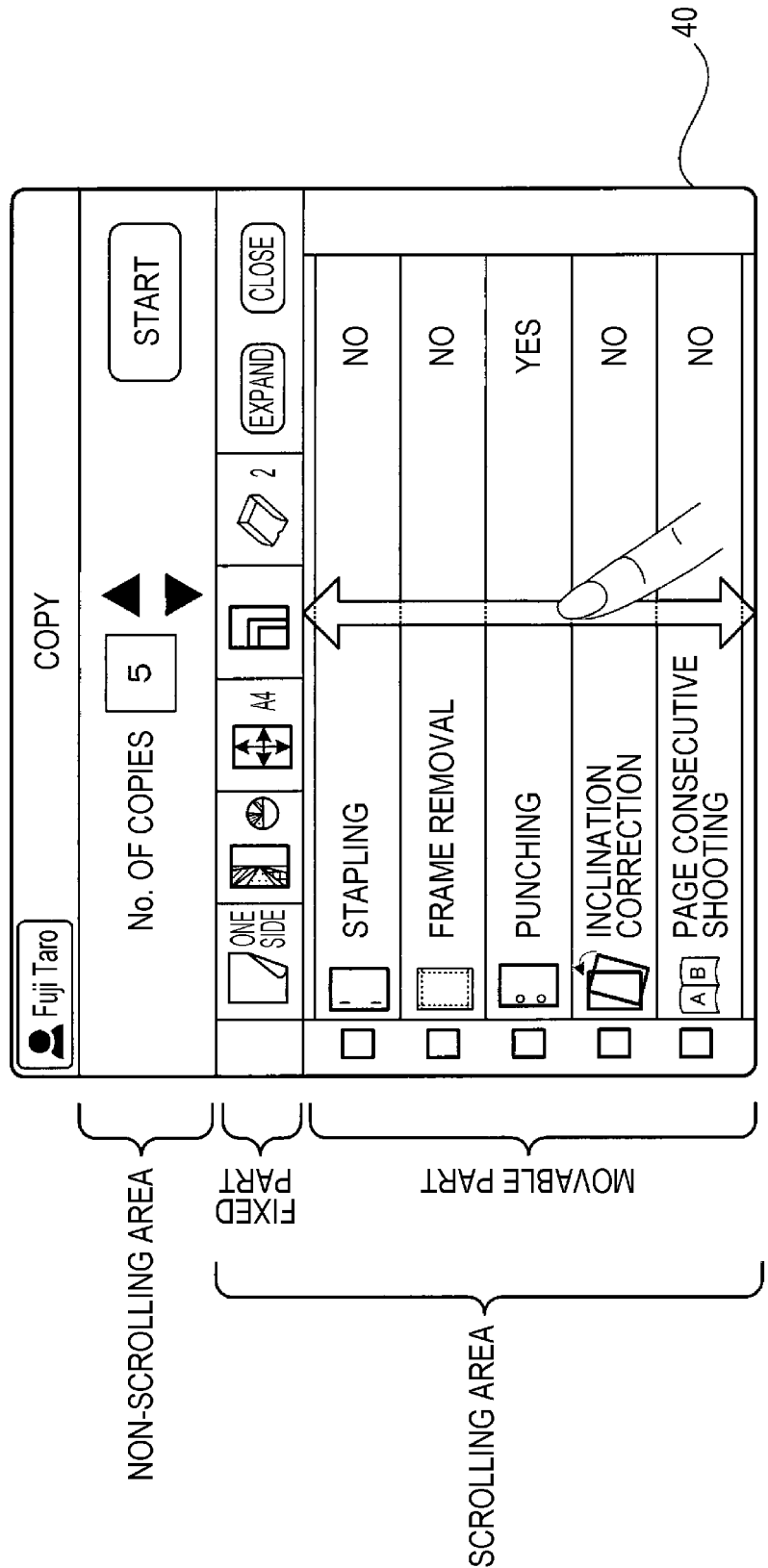
FIG. 19 is a diagram illustrating an example of an operation screen at a time when the fixed part has been reduced in size by displaying the icons and settings in a simplified manner.

FIG. 19 illustrates an example of an operation screen at a time when current settings are displayed in the fixed part in a simplified manner along with icons indicating list items to reduce the fixed part in size.

In the example of the operation screen illustrated in FIG. 19, for example, an icon indicating the list item of "color mode" is displayed along with an icon indicating that a setting is "color". In addition, in the example of the operation screen illustrated in FIG. 19, an icon indicating the list item of "duplex printing" is displayed in a single operation button along with a word "one side", which indicates that one-side printing is set.

Figure 20:
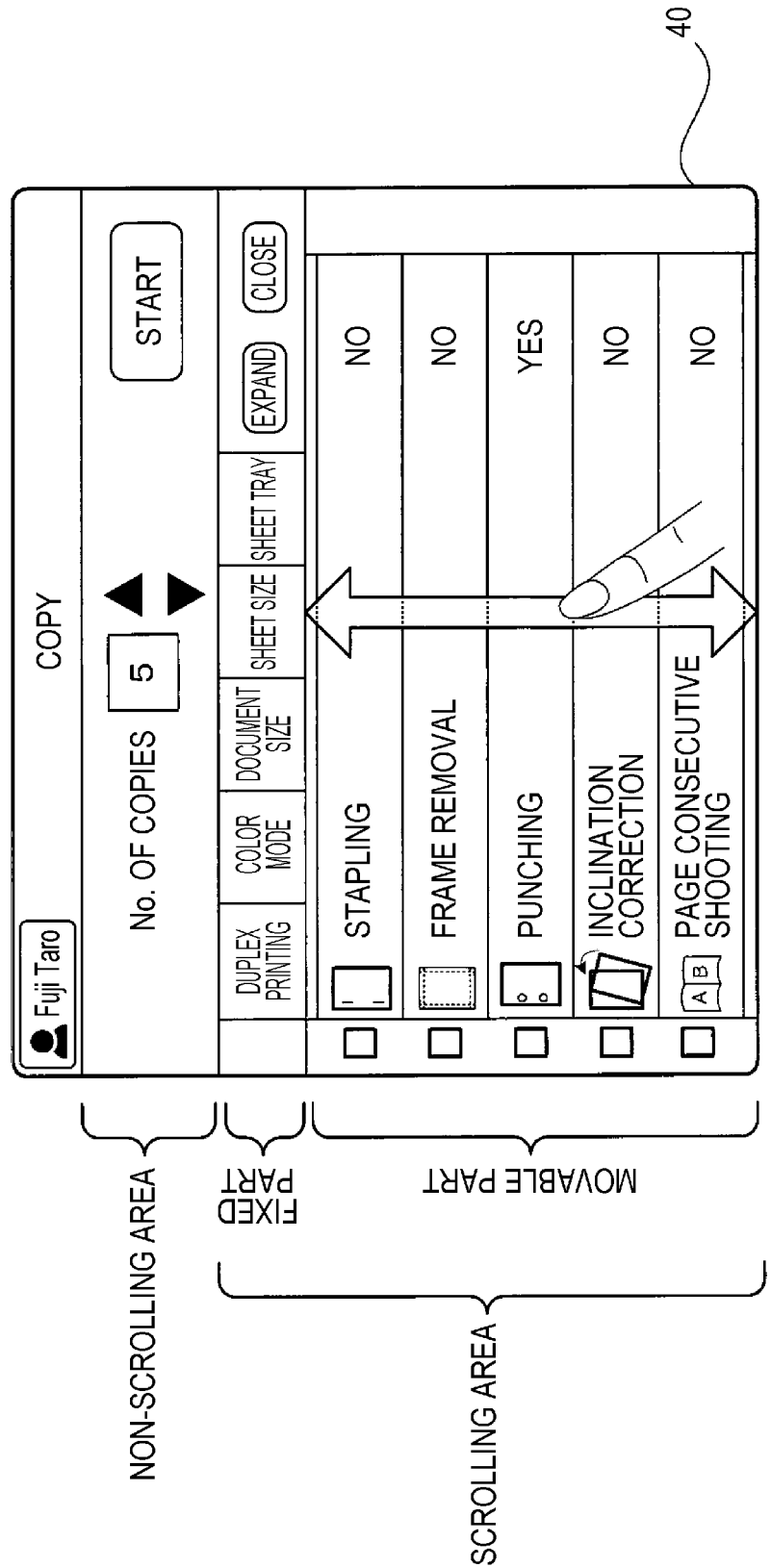
FIG. 20 is a diagram illustrating an example of an operation screen at a time when the fixed part has been reduced in size by displaying only item names.

FIG. 20 illustrates an example of an operation screen at a time when the fixed part has been reduced in size by displaying only text indicating list items in a simplified manner.

In the example of the operation screen illustrated in FIG. 20, operation buttons including text such as "duplex printing" and "color mode" are displayed in the fixed part. Alternatively, the item names before the reduction in size may be displayed as they are, or abbreviations may be prepared for long item names and operation buttons including the abbreviations may be displayed in the fixed part. In FIG. 20, for example, item names such as "output sheet size" and "sheet tray setting" are replaced by abbreviations such as "sheet size" and "tray setting". Alternatively, first N (a predetermined number) letters of long item names, for example, may be included in operation buttons as abbreviations.

Figure 21:
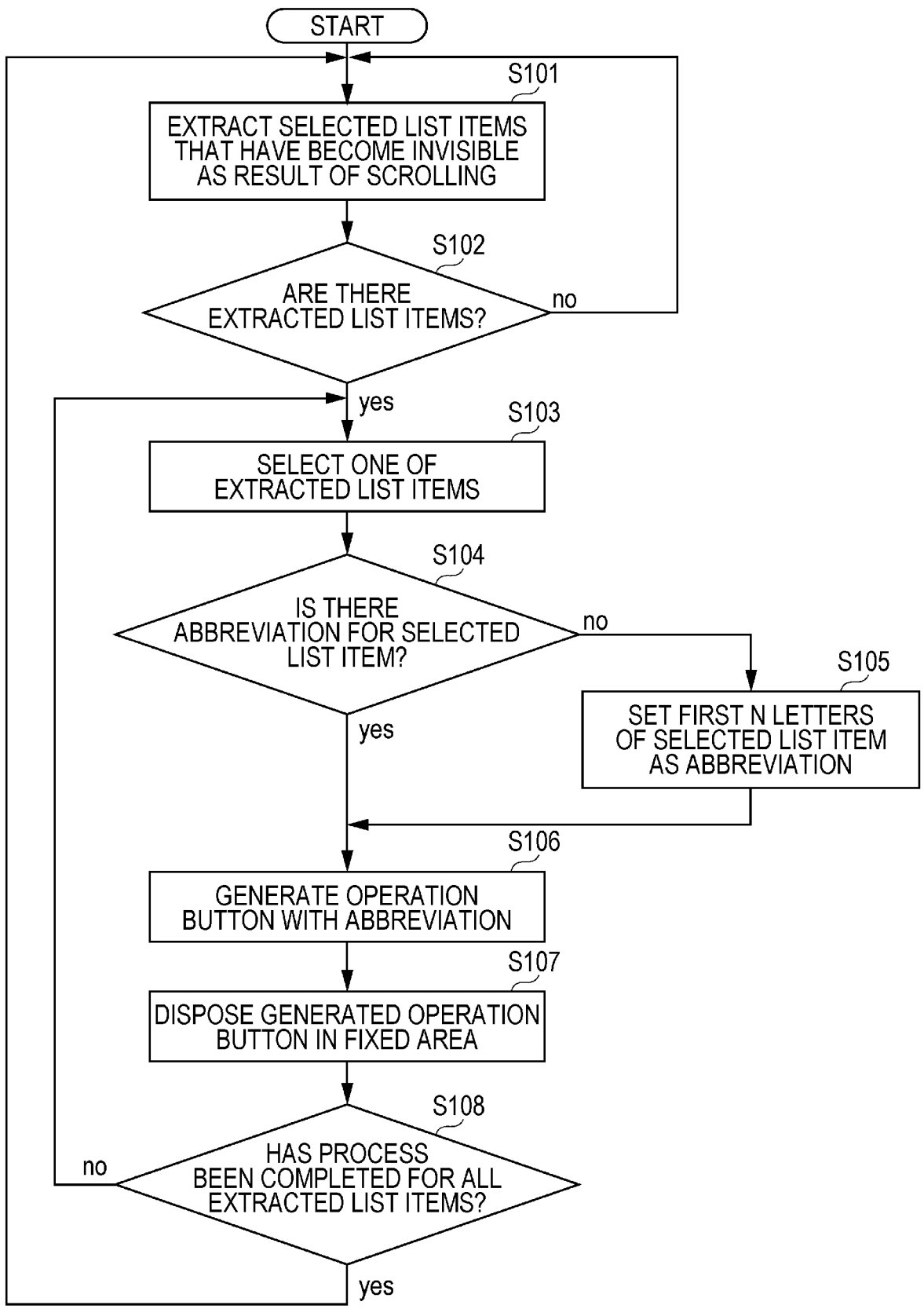
FIG. 21 is a flowchart illustrating a display control process at a time when the fixed part has been reduced in size by including item names in operation buttons.

A display control process performed when the fixed part is reduced in size by including item names in operation buttons will be described with reference to a flowchart of FIG. 21.

Here, a process will be described at a time when the fixed area has already been reduced in size and list items selected during scrolling are newly added to the fixed part.

The control unit 31 extracts selected list items that have entered the invisible range as a result of scrolling (step S101). If there are extracted list items (YES in step S102), the control unit 31 selects one of the extracted list items (step S103).

If there is an abbreviation for the selected list item (YES in step S104), the control unit 31 generates an operation button with the abbreviation (step S106).

If there is no abbreviation for the selected list item (NO in step S104), the control unit 31 sets first N letters of an item name of the selected list item as an abbreviation (step S105). The control unit 31 then generates an operation button with the abbreviation set in step S105 (step S106).

The control unit 31 then disposes the generated operation button in the fixed part (step S107). If there is a list item extracted in step S102 for which the process has not been completed (NO in step S108), the control unit 31 repeats steps S103 to S107.

Modifications

Although the present disclosure has been applied to the image forming apparatus 10 in the above exemplary embodiment, the present disclosure is not limited to this. The present disclosure may also be applied to any information processing apparatus having a function of scrolling through a plurality of list items, such as a smartphone, a tablet terminal apparatus, or a personal computer.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a display, comprising
   a touch panel that receives a user instruction based on a touch operation performed on the display; and
   a processor that, when a plurality of list items are displayed in a display area of the display, controls the display such that, if the touch panel receives an instruction to scroll through the plurality of list items, the plurality of list items are scrolled in the display area and, if a user selects one or more list items from the plurality of list items, the selected one or more list items are fixed in a fixed part at an end of the display area in a scrolling direction,
   wherein, if a size of the fixed part of the display area becomes equal to or larger than a predetermined value, the processor reduces the size of the fixed part by displaying only symbols respectively indicating the selected list items in the fixed part.

2. The information processing apparatus according to claim 1,
   wherein, if the display area has entered a predetermined state as a result of the user instruction received by the touch panel, the processor reduces the size of the fixed part.

3. The information processing apparatus according to claim 2,
   wherein, if size of the part of the display area in which the list items are scrollable becomes equal to or smaller than the predetermined value, the processor reduces the size of the fixed part and increases in size the part of the display area in which the list items are scrollable.

4. The information processing apparatus according to claim 3,
   wherein, if the touch panel receives the instruction to scroll through the plurality of list items after the size of the part of the display area in which the list items are scrollable becomes equal to or smaller than the predetermined value, the processor reduces the size of the fixed part and increases in size the part of the display area in which the list items are scrollable.

5. The information processing apparatus according to claim 1,
   wherein, if the selected one or more list items reach the end of the display area in the scrolling direction as a result of scrolling, the processor controls the display such that the selected one or more list items are fixed at the end of the display area.

6. The information processing apparatus according to claim 2,
   wherein, if the selected one or more list items reach the end of the display area in the scrolling direction as a result of scrolling, the processor controls the display such that the selected one or more list items are fixed at the end of the display area.

7. The information processing apparatus according to claim 3,
   wherein, if the selected one or more list items reach the end of the display area in the scrolling direction as a result of scrolling, the processor controls the display such that the selected one or more list items are fixed at the end of the display area.

8. The information processing apparatus according to claim 4,
   wherein, if the selected one or more list items reach the end of the display area in the scrolling direction as a result of scrolling, the processor controls the display such that the selected one or more list items are fixed at the end of the display area.

9. The information processing apparatus according to claim 5,
   wherein, if the one or more list items selected by the user reach the end of the display area in the scrolling direction as a result of the scrolling, the processor controls the display in such a way as to reduce the selected one or more list items in size and fix the selected one or more list items at the end of the display area.

10. The information processing apparatus according to claim 2,
    wherein the processor reduces the one or more list items in size by displaying only an item name of the one or more list items.

11. The information processing apparatus according to claim 2, wherein the processor reduces the one or more list items in size by displaying the symbols that reflect settings of the one or more list items.

12. A non-transitory computer readable medium storing a program causing a computer to execute a process, the process comprising:

receiving a user instruction based on a touch operation performed on a display having a touch panel function;

controlling, when a plurality of list items are displayed in a display area of the display, the display such that, if an instruction to scroll through the plurality of list items is received in the receiving, the plurality of list items are scrolled in the display area; and controlling the display such that, if a user selects a one or more list items from the plurality of list items, the selected one or more list items are fixed in a fixed part at an end of the display area in a scrolling direction, wherein, if a size of the fixed part of the display area becomes equal to or larger than a predetermined value, the fixed part is reduced in size by displaying only symbols respectively indicating the selected list items in the fixed part.

13. An information processing apparatus comprising:

display means that has a touch panel function;

operation reception means for receiving a user instruction based on a touch operation performed on the display means; and display control means for, when a plurality of list items are displayed in a display area of the display means, controlling the display means such that, if the operation reception means receives an instruction to scroll through the plurality of list items, the plurality of list items are scrolled in the display area and, if a user selects a one or more list items from the plurality of list items, the selected one or more list items are fixed in a fixed part at an end of the display area in a scrolling direction, wherein, if a size of the fixed part of the display area becomes equal to or larger than a predetermined value, the display control means reduces the size of the fixed part by displaying only symbols respectively indicating the selected list items in the fixed part.

* * * * *